US008483786B2

(12) United States Patent
Ramies et al.

(10) Patent No.: US 8,483,786 B2
(45) Date of Patent: Jul. 9, 2013

(54) CASE FOR HANDHELD DEVICES WITH ONE OR MORE INTEGRAL TOOLS

(75) Inventors: Thomas M. Ramies, Portola Valley, CA (US); Clay W. Baker, Portola Valley, CA (US)

(73) Assignee: West|280, Incorporated, Portola Valley, CA (US)

( * ) Notice: Subject to any disclaimer, the term of this patent is extended or adjusted under 35 U.S.C. 154(b) by 65 days.

(21) Appl. No.: 12/961,297

(22) Filed: Dec. 6, 2010

(65) Prior Publication Data

US 2011/0136555 A1 Jun. 9, 2011

Related U.S. Application Data

(60) Provisional application No. 61/266,943, filed on Dec. 4, 2009.

(51) Int. Cl.
*H04M 1/00* (2006.01)

(52) U.S. Cl.
USPC .................. 455/575.8; 455/550.1; 455/556.1

(58) Field of Classification Search
USPC ................................. 455/550.1, 575.8, 556.1
See application file for complete search history.

(56) References Cited

U.S. PATENT DOCUMENTS

| 7,125,145 | B2 | 10/2006 | Gardiner et al. | |
| 2004/0016058 | A1* | 1/2004 | Gardiner et al. | 7/119 |
| 2006/0146483 | A1 | 7/2006 | Patino et al. | |
| 2008/0232089 | A1 | 9/2008 | Riccardi | |
| 2010/0033069 | A1* | 2/2010 | Chang | 312/333 |

OTHER PUBLICATIONS

"iBottleopener" downloaded from the Internet on Feb. 2, 2011 < http://ibottleopener.com/ > (1 page).
"About Be a HeadCase" downloaded from the Internet on Feb. 3, 2011 < http://beaheadcase.com/index.php/about/ > (2 pages).
"Be a Headcase Shop" downloaded from the Internet on Feb. 3, 2011 < http:/beaheadcase.com/index.php/shop/ > (3 pages).
Office Action received in Australian international application No. 2011100753 Applicant West 280, Incorporated, dated Aug. 8, 2011, 2 pages.
Current Claims of Australian international application No. 2011100753 dated Aug. 2011, Applicant West 280, Incorporated, 2 pages.

* cited by examiner

*Primary Examiner* — Kwasi Karikari
(74) *Attorney, Agent, or Firm* — Hickman Palermo Truong Becker Bingham Wong LLP; Daniel D. Ledesma

(57) ABSTRACT

An apparatus comprises a case and additional protective materials within the case for handheld devices. The additional protective materials are metals, plastics, and/or composites. The additional protective materials may be molded into a single case to form a second layer of protection on one side of the device's case. Part of the protective housing is an internal rigid tool that, when exposed, is able to be used for opening a bottle.

22 Claims, 17 Drawing Sheets

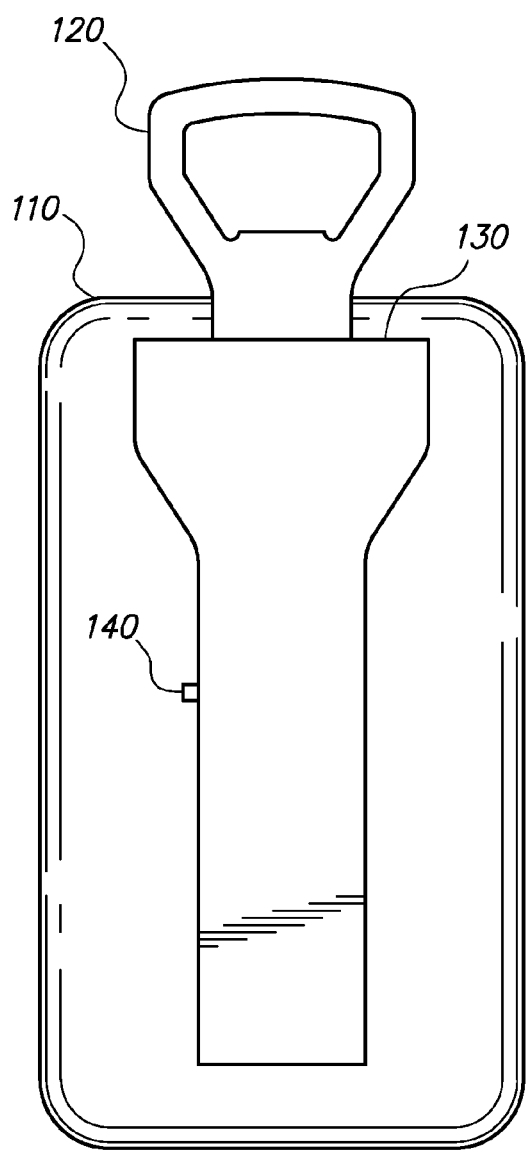
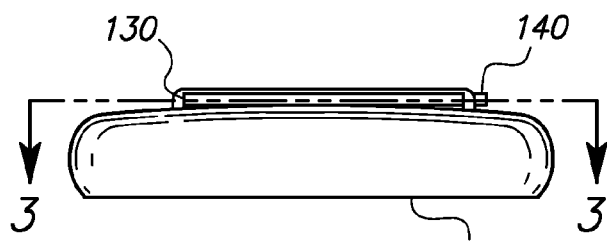
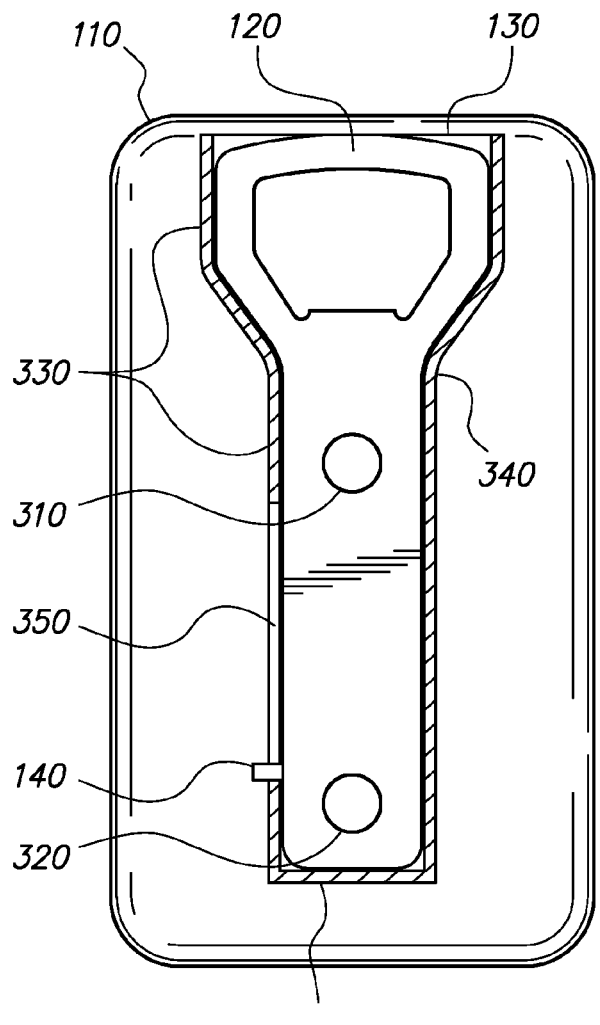
FIG. 1
FIG. 2
FIG. 3

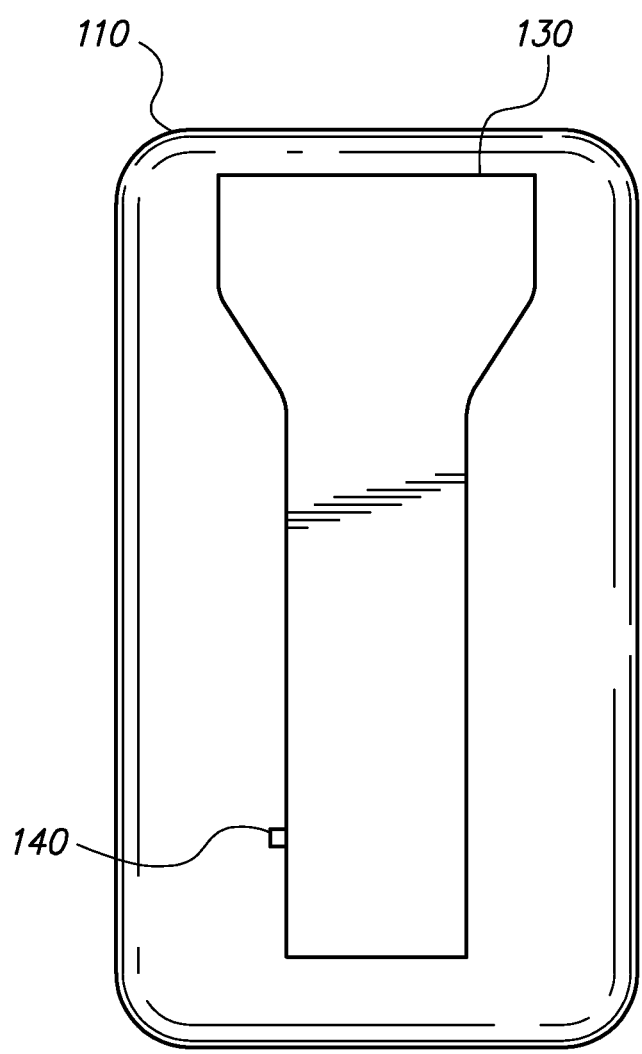 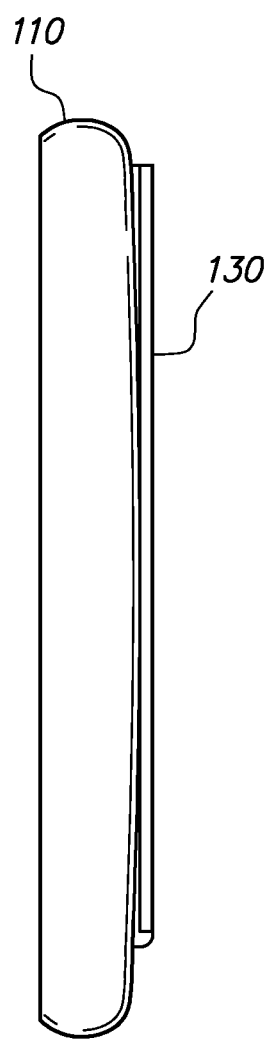
FIG. 4  FIG. 5

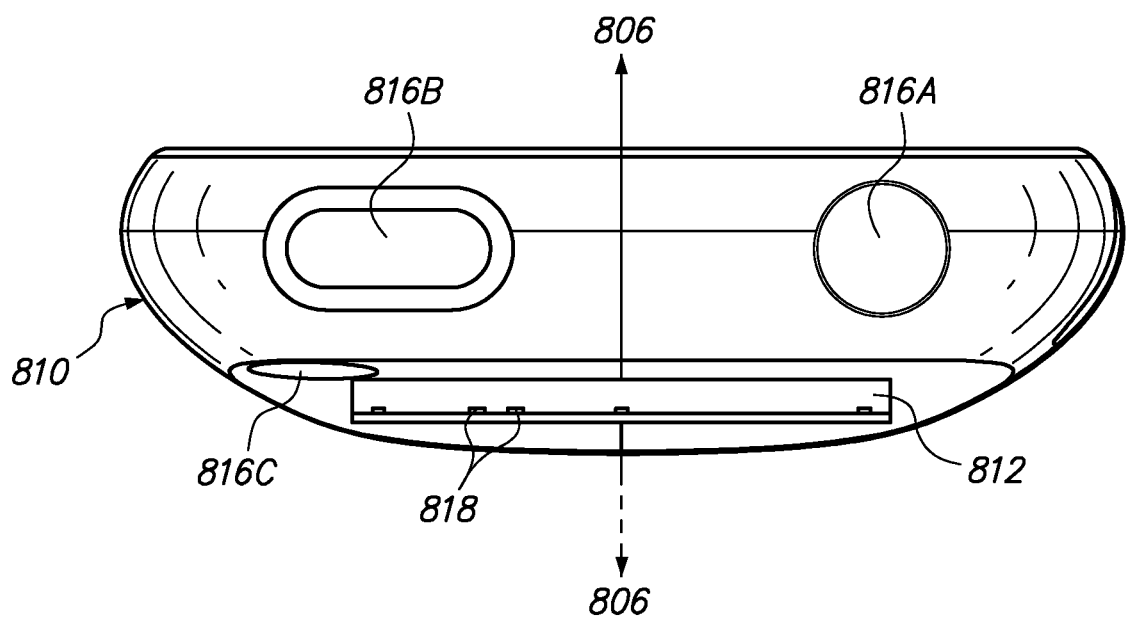
FIG. 8B1
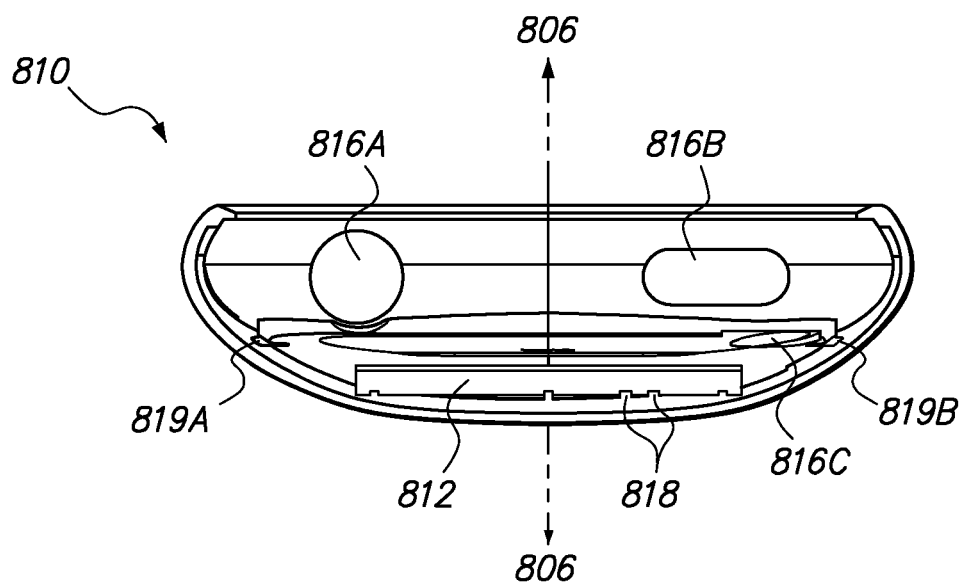
FIG. 8B2

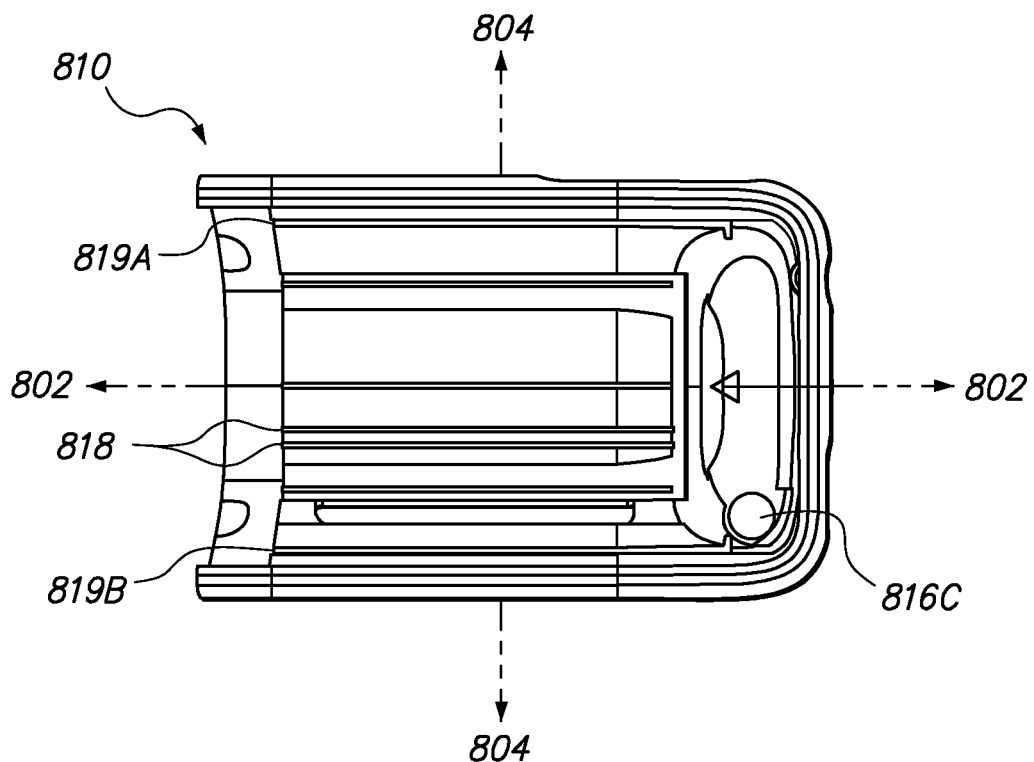
FIG. 8B3
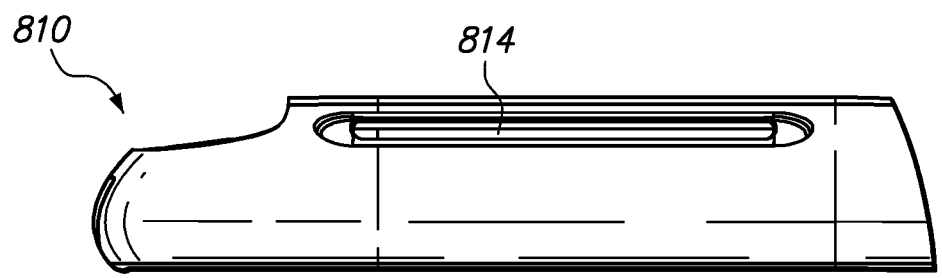
FIG. 8B4

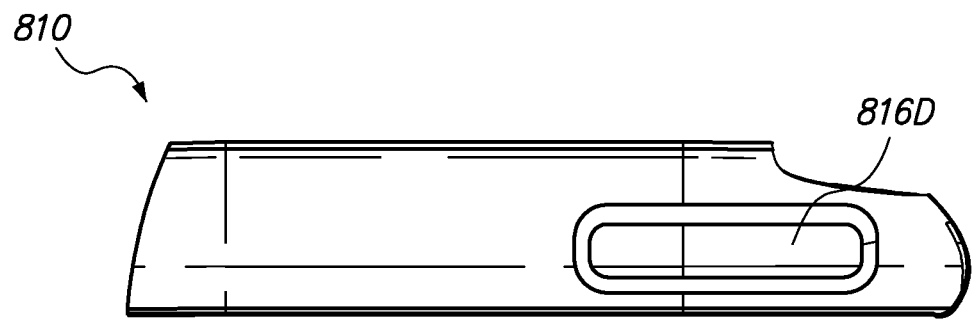
FIG. 8B5
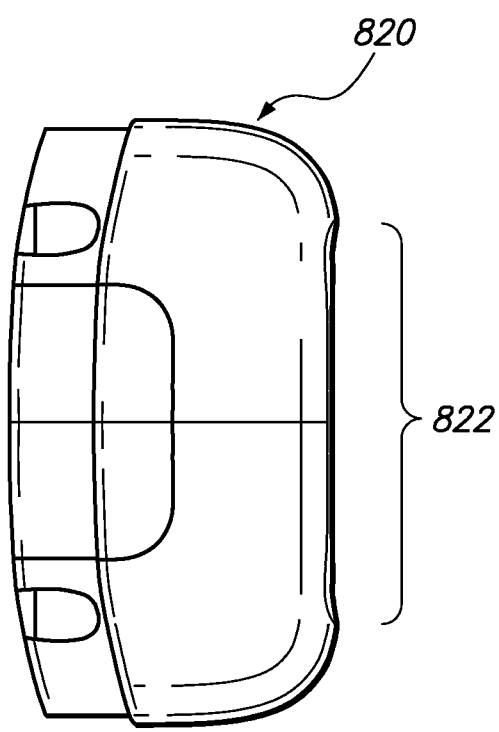
FIG. 8C1

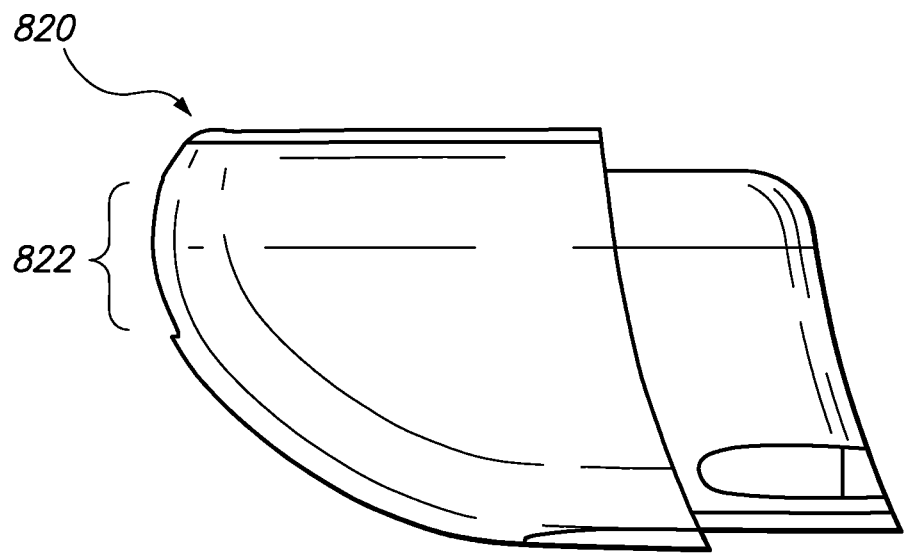
FIG. 8C2
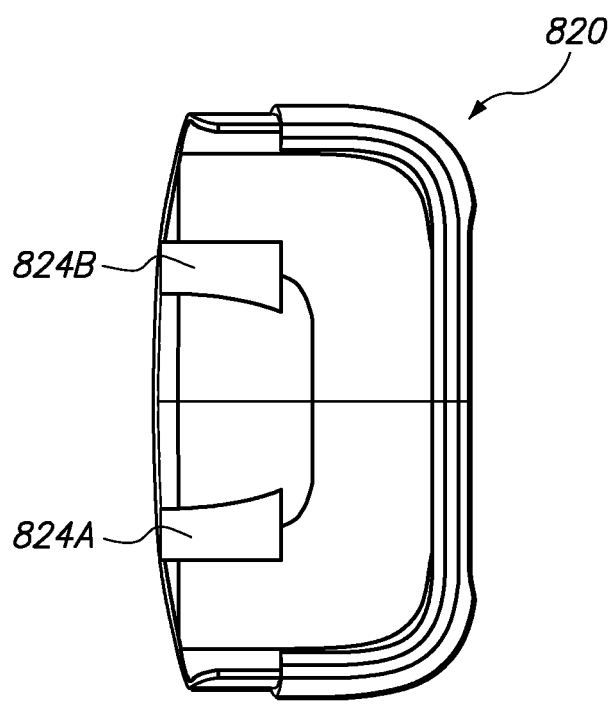
FIG. 8C3

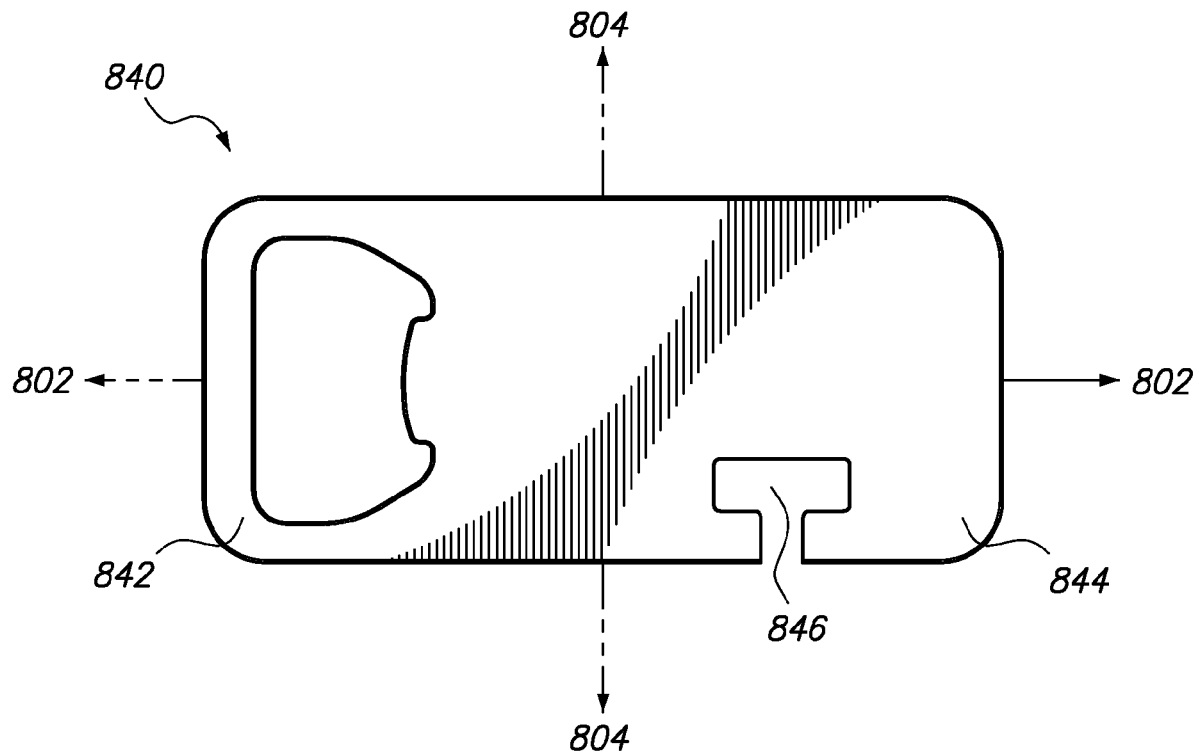
FIG. 8D1
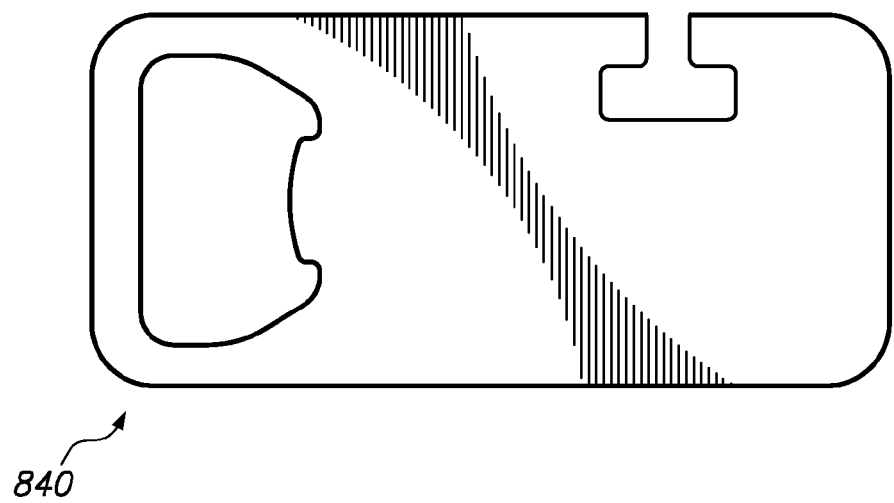
FIG. 8D2

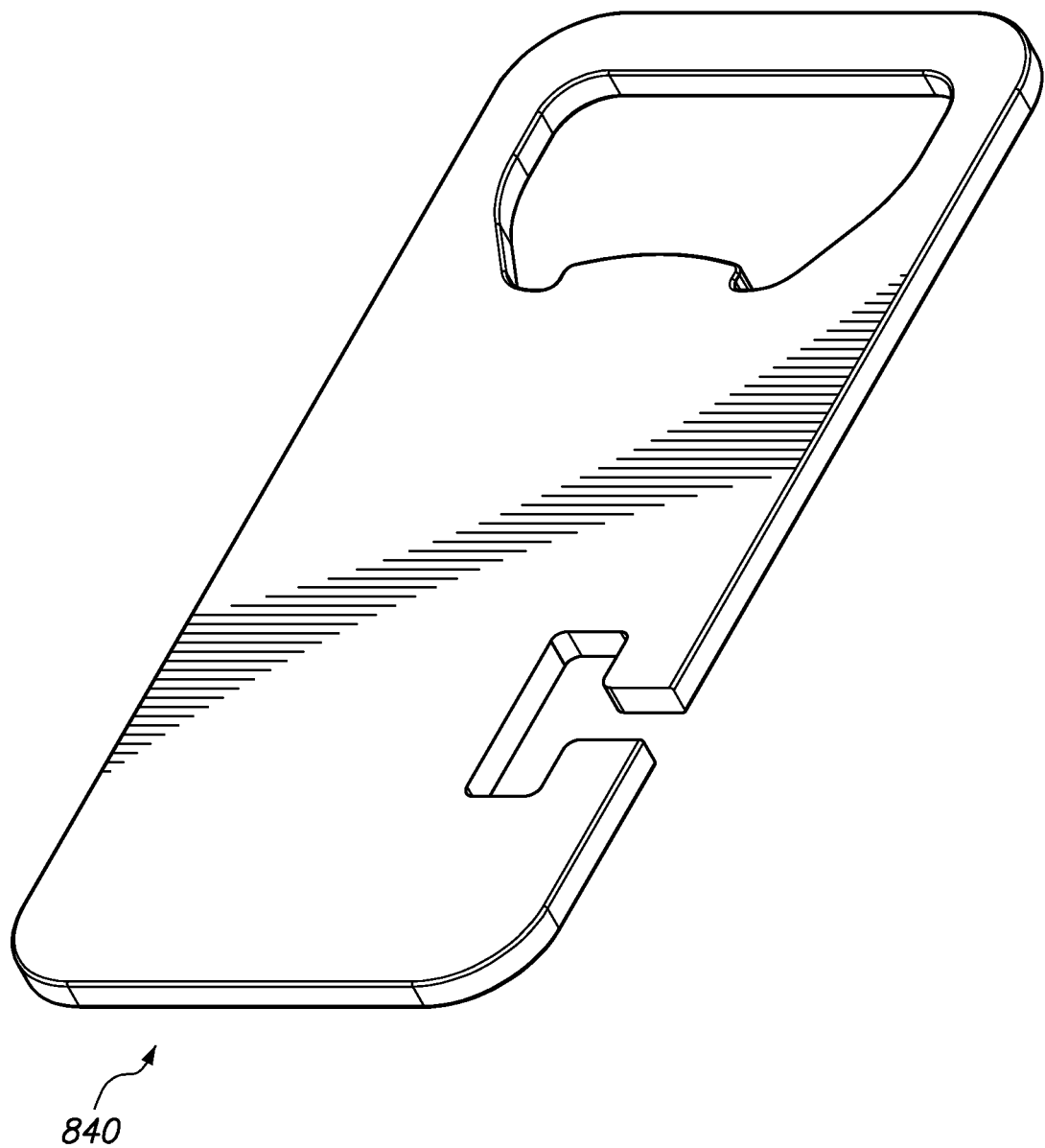
FIG. 8D3

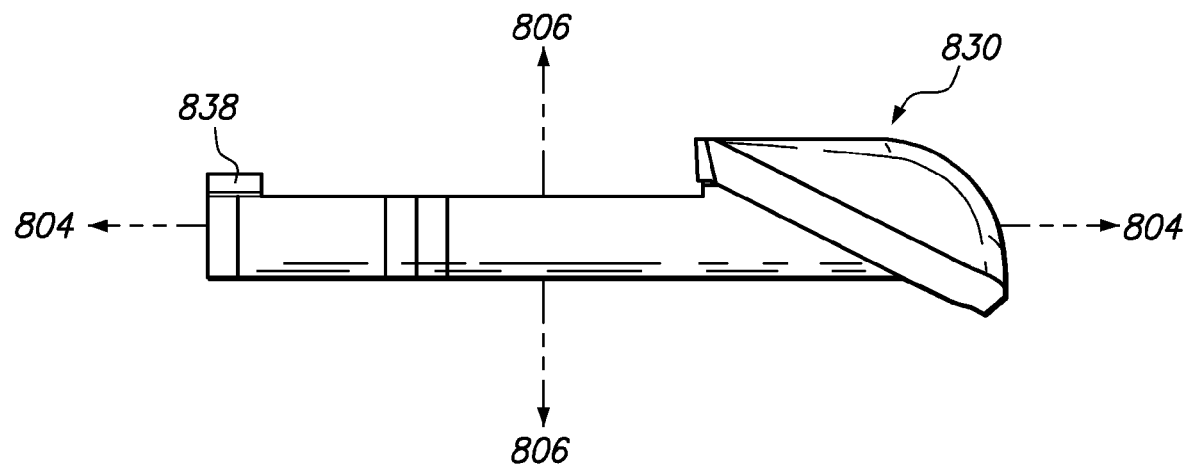
FIG. 8E1
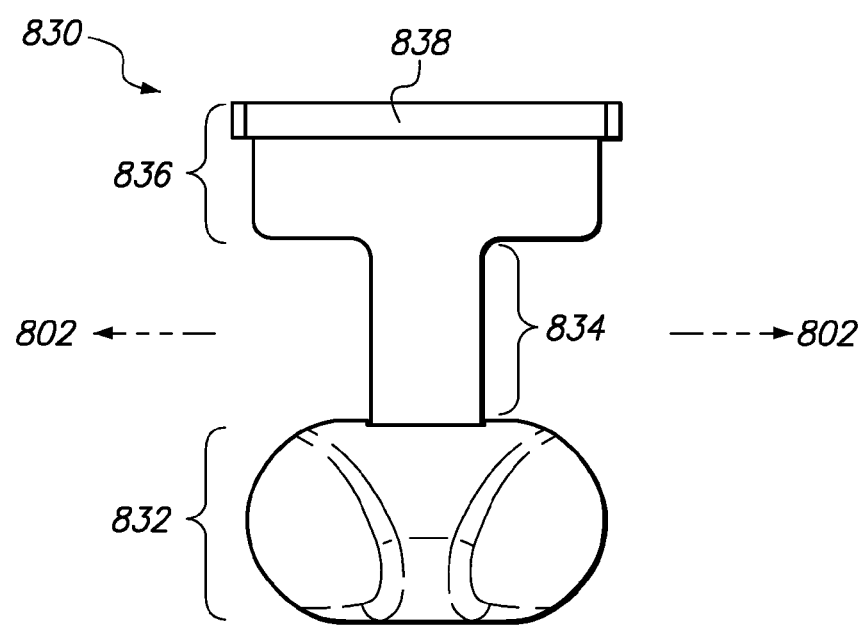
FIG. 8E2

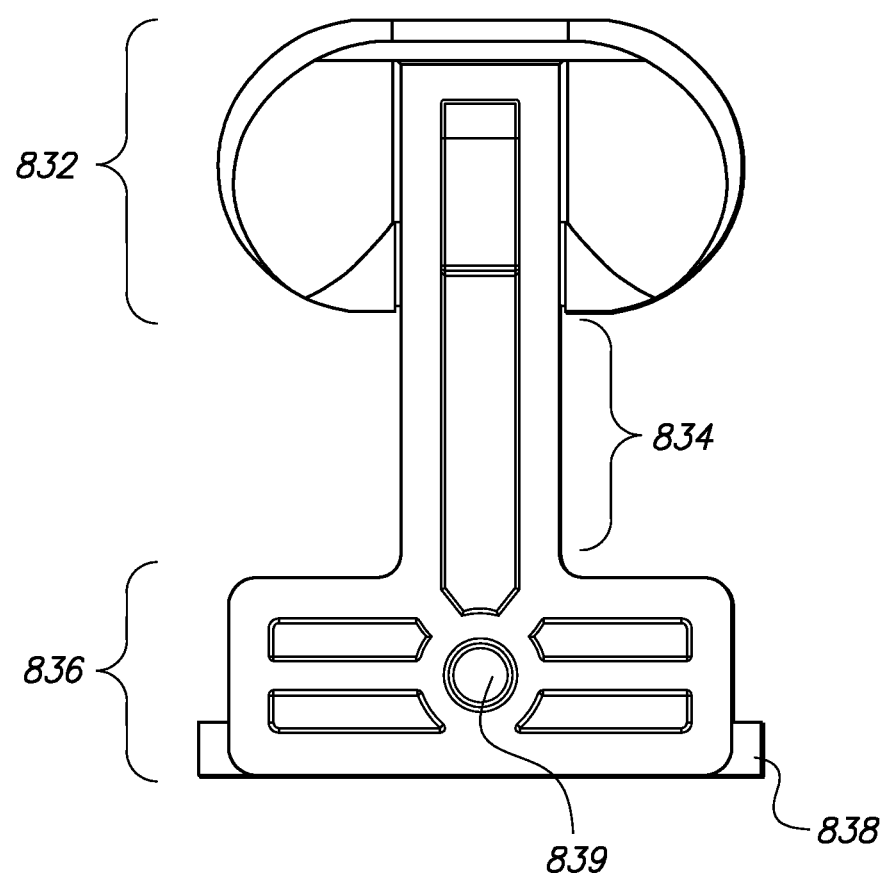
FIG. 8E3

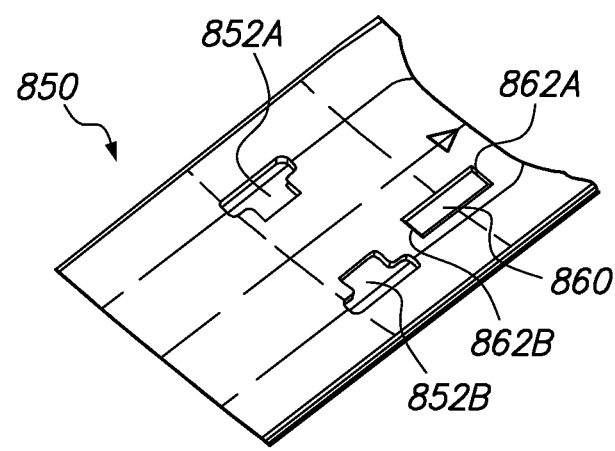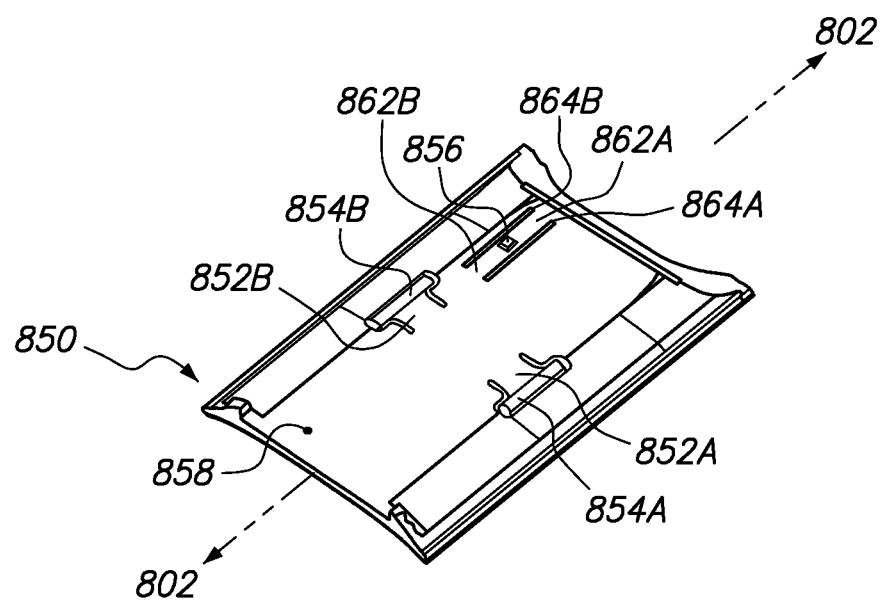
FIG. 8F1

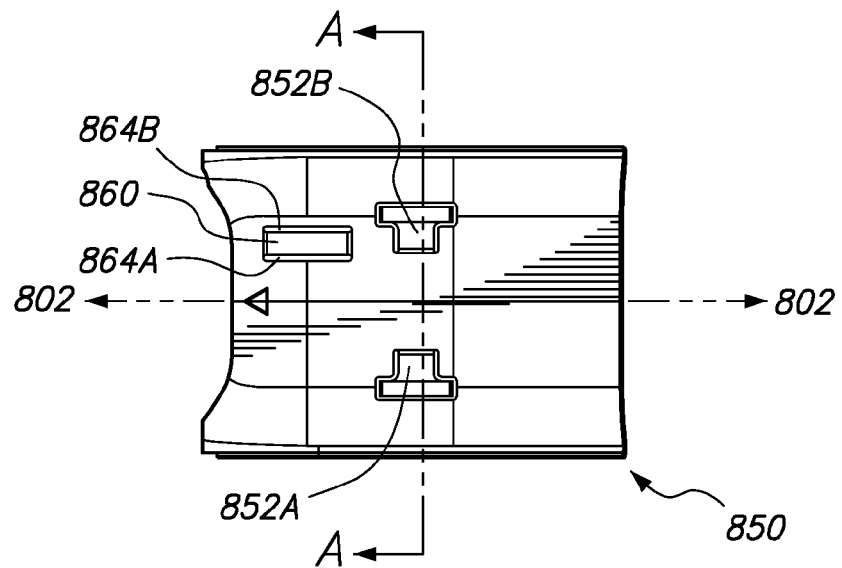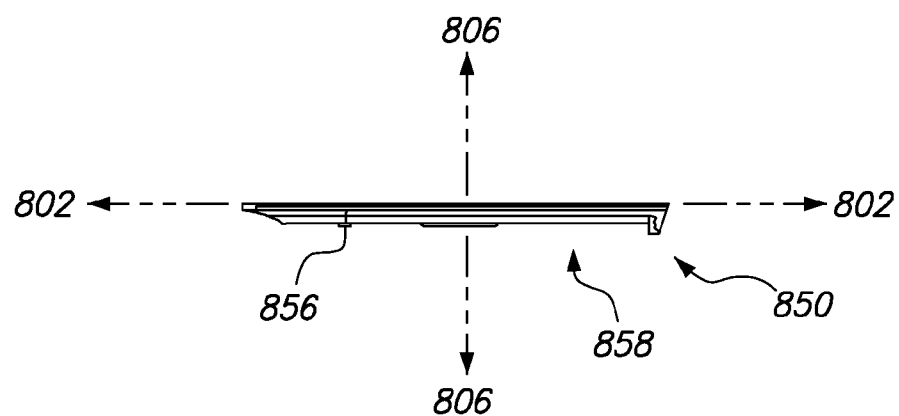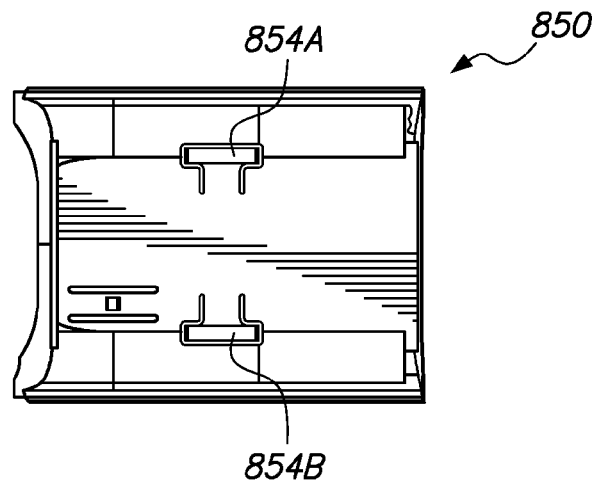
FIG. 8F2

CASE FOR HANDHELD DEVICES WITH ONE OR MORE INTEGRAL TOOLS

CROSS-REFERENCE TO RELATED APPLICATIONS

Benefit Claim

This application claims the benefit of Provisional Application 61/266,943, filed Dec. 4, 2009, the entire contents of which is hereby incorporated by reference as if fully set forth herein, under 35 U.S.C. §119(e).

TECHNICAL FIELD

The present invention relates to a case for a handheld device, and more particularly to a case that includes a tool or an appendage that provides an additional benefit that is different than protecting the handheld device.

BACKGROUND OF THE DISCLOSURE

With the advancement of technology in the fields of electronics and computers, more powerful features and elements have been integrated into handheld electronic devices. However, the integration of these innovations into handheld devices has amounted to the production of very expensive and delicate devices. Accessories, in the form of cases, have been produced to keep the handheld devices safe from unexpected incidents due to mishandling, but existing cases only provide the single function of providing physical protection from unintentional mishaps.

BRIEF DESCRIPTION OF THE DRAWINGS

In the drawings:

FIG. 1 is a posterior view of a case that includes a tool, where a part of the tool is exposed from an internal layer in the case;

FIG. 2 is a top plan view of a case that includes an enclosure into which a tool is inserted;

FIG. 3 is a posterior view of a case that includes a tool in an enclosed position;

FIG. 4 is a posterior view of a case that includes an enclosure into which a tool is inserted;

FIG. 5 is a side view of a case that includes an enclosure into which a tool is inserted;

FIG. 8A, FIGS. 8B1-5, FIGS. 8C1-3, FIGS. 8D1-3, FIGS. 8E1-3, FIGS. 8F1-2 are views of different components of an example case.

DETAILED DESCRIPTION

Figure 6:
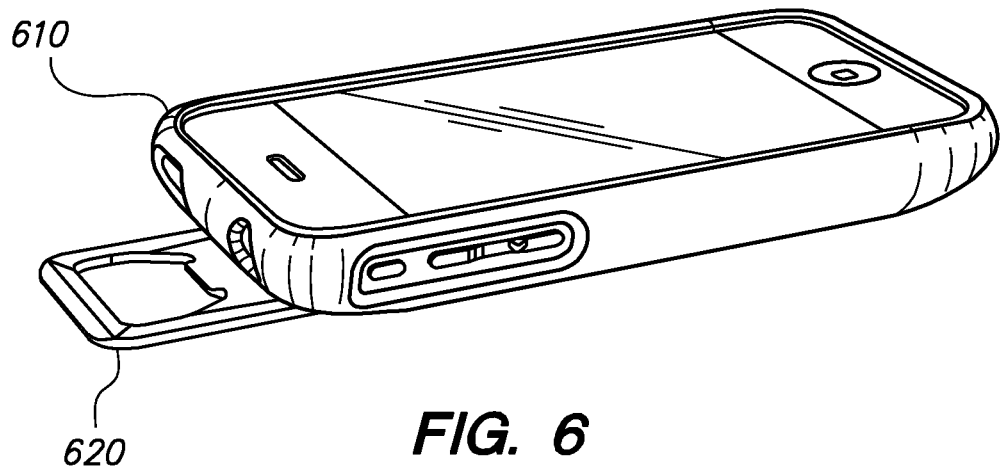
FIG. 6 is a perspective view of the face of a handheld device that is partially-surrounded by a case, to which a tool is secured.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. General Overview

A case for handheld devices is described where the case comprises a rigid shell and a rigid tool in the rigid shell. Examples of handheld devices with which such a case may be used include cell phones, smart phones, handheld computers, GPS devices, and digital media players.

The rigid tool may serve one or more purposes. In an embodiment, the tool is a bottle opener. In other embodiments, the tool may be a knife, a nail file, or a wine bottle opener, which is shaped differently than a typical bottle opener. Embodiments may use any kind of tool that may be formed in a generally planar piece of rigid material that may move by sliding into and out of the case, or that may rotate from the case, or that may extend from a rear surface of the case.

In this description, the term "case" may refer to only the rigid shell or to both the rigid shell and the tool.

In an embodiment, not only does the case serve as a means to attach a tool to a handheld device, the case serves as a means to provide protection to at least a portion of the handheld device.

The tool may be attached or mounted to the case in numerous ways. For example, the tool may be secured to the outside of the case, in which case the tool is continuously exposed, whether or not the tool is in a position for use.

In an alternative embodiment, the case includes an enclosure into which the tool may be inserted and encased. When the tool is fully encased into the enclosure, the tool is not exposed, fully or partially. When the tool is fully extended from the enclosure in a position at which the tool may be used, an end of the tool is fully exposed. The enclosure may be molded into the case or may itself be a separate piece that is attached or secured to the case.

In a related embodiment, the case is designed to store or house one or more items, whether rigid or not. Thus, the case comprises a storage space that may be used to store or house another object, such as credit cards, cash, ear buds, a golf green repair tool, a radar detector, electronics for satellite communications, a laser pointer, a Wii motion controller, a Swiss army knife, a USB drive, or a flash light. The storage space may be adapted to one or more of these or other items. Alternatively, the storage space may not be adapted to any item, but may be generic enough to allow multiple types of items to be stored in the storage space.

In an embodiment, the case is adapted to store a USB (or Universal Serial Bus) drive that, when attached to the case, is also connected to a USB dock of the handheld device in order to transfer data directly to the handheld device. In this way, the case allows for added memory storage for the handheld device.

In an embodiment, the case is adapted to allow one of a removable credit card swipe, a removable battery, or a removable solar panel to be attached to the case. When attached to the case, the removable battery or removable solar panel is connected to the handheld device and, when connected, is able to charge a battery of the handheld device.

In an embodiment, a case includes an electronic chip that is associated with a user's account. The case is designed to allow the electronic chip to interface with a handheld device that is secured to the case. When secured to the case, the handheld device operates as if the handheld device belongs to the user associated with the user account. For example, a cell phone is inserted into a particular case that includes an electronic chip. The electronic chip is associated with an account of a particular user. The particular user may operate the cell phone as if the cell phone belonged to the particular user. Thus, any data and/or voice usage of the cell phone while the cell phone is secured in the case is accounted for in the particular user's cell account. If a second (i.e., different) cell phone is inserted into the particular case, then any data and/or voice usage of the second cell phone while the second cell phone is secured in the case is also accounted for in the particular user's cell account.

II. Views of a Case

FIG. 1 is a posterior view of a case 110 that includes a tool. In an embodiment, the tool comprises a bottle opener 120. In this view, the opening end of the bottle opener 120 is exposed from an enclosure 130 or recess that is part of the case 110. Any display or screen of the handheld device is exposed on an opposite side of the case 110 that is depicted in FIG. 1.

In an embodiment, case 110 includes a thumb 140 that is used to slidably extend or move the bottle opener 120 to an extended position. From the extended position, the bottle opener 120 can be used to remove a bottle cap. The thumb 140 is also used to slide the bottle opener 120 back into the enclosure 130 to an enclosed or initial position. In an embodiment where the case 110 does not include an enclosure, the initial position of the bottle opener 120 is a position in which the bottle opener 120 cannot be used to remove a bottle cap.

FIG. 2 is a top-side view of the case 110. This view includes a different view of enclosure 130 and thumb 140. Specifically, FIG. 2 depicts, as part of the enclosure 130, an opening from which the bottle opener 120 extends. FIG. 2 also depicts a line that indicates how a cross section of the enclosure 130 is depicted in FIG. 3. As depicted in FIG. 2, the enclosure 130 may be designed to take up minimal space relative to the rest of the case 110.

FIG. 3 is a posterior view of the case 110 that includes the bottle opener 120 in an enclosed or initial position. This posterior view depicts the bottle opener 120 and parts of the enclosure 130 with half the enclosure 130 removed. FIG. 3 also depicts holes 310, 320 of a spring and a ball bearing locking mechanism that is used to lock the bottle opener 120 in an enclosed position in order to keep from exiting the enclosure 130 unintentionally. FIG. 3 also depicts a cross section of the housing 330 and a sidewall 340 of the enclosure 130. The housing 330 includes a gap 350 that allows for movement of the thumb 140.

FIG. 4 is a posterior view of the case 110 and the enclosure 130. FIG. 4 is similar to FIG. 1 except that the bottle opener is in an enclosed or initial position. In the position of FIG. 4, no part of the bottle opener extends beyond the opening of the enclosure 130. The position of the thumb 140 in FIG. 4 indicates an enclosed position, whereas the position of thumb 140 in FIG. 1 indicates an extended position.

FIG. 5 is a side view of the case 110 and the enclosure 130. A face of the handheld device may be viewed at an anterior view of the case 110. Similar to FIG. 2, FIG. 5 depicts the minimal space (relative to the remainder of the case 110) that is occupied by the enclosure 130.

FIG. 6 is a perspective view of the face of a handheld device 600 that is partially-surrounded by a case 610, to which a bottle opener 620 is secured. In this figure, the bottle opener 620 is in an extended position, in which the bottle opener 620 may be used to open a bottle.

The face of the handheld device 600 might include a visual display, one or more physical buttons to operate the handheld device 600, and a speaker for audio output. The case 610 may comprise one or more openings to allow different parts of the handheld device 600 to be exposed. For example, one of the openings allows volume controls of the handheld device 600 to be exposed to a user. Another opening might allow a microphone to be exposed. Another opening might allow a cord to be plugged into the handheld device 600 in order to charge a battery of the handheld device 600.

Figure 7:
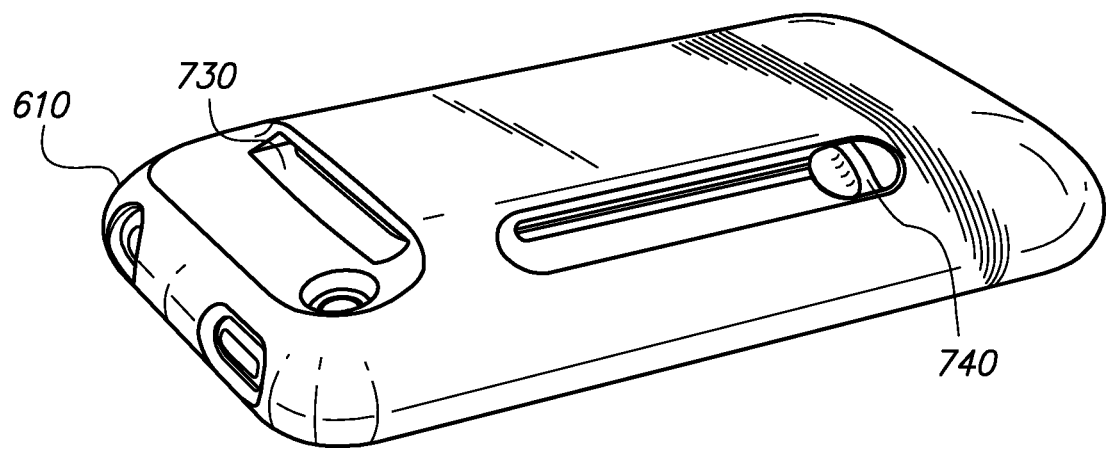
FIG. 7 is a perspective view of a case with a thumb for exposing and enclosing a tool.

FIG. 7 depicts a perspective view of the case 610 with an enclosure 730 and a thumb 740. The thumb 740 is for moving the bottle opener 620 to an extended position and to an enclosed position. In FIG. 7, the bottle opener 620 is in an enclosed position in which only a small portion of the bottle opener 620 is exposed to view.

III. Composition of the Case

Embodiments may use any particular material for the case. For example, the case may be molded from any plastic, metal, carbon fiber, or composite materials, and may comprise wood, pressed or laminated papers, resins, or other materials.

In an embodiment where the case includes an enclosure, the enclosure is a separate unit from the case and is attached to the case. In this embodiment, the enclosure may comprise any of the materials identified above and is large enough to store one or more items. The enclosure may be attached or secured to the case using any mechanism, such as screw(s), bolt(s), and/or adhesive, resin, mechanical frictional elements such as tabs and slots, or other means. In this embodiment, when the enclosure is detached from the case, any item that is stored within the enclosure can also be moved independent of the case.

In an alternative embodiment, the case and the enclosure are a single unit comprising any of the materials identified above. In other words, the enclosure is not affixed to or attached to the case, but is rather an integral component of the case.

The material(s) from which the enclosure is made may provide additional protection to a portion of the handheld device.

IV. Operating the Bottle Opener

In an embodiment, the bottle opener slides out of the enclosure in response to movement of a button that allows the bottle opener to move or slide relatively freely.

In an embodiment, the bottle opener is entirely removable from the case. In other words, the bottle opener may be detached from the case and operated independent of the case. The case may be designed such that the bottle opener is easily attachable to and detachable from the case.

In an embodiment, the case includes a locking mechanism that secures the bottle opener in the initial position and, optionally, in the extended position. The locking mechanism may comprise a spring. The spring may be disposed within a recess of the case or the enclosure 130. The spring may be contiguous with an end portion of the bottle opener that is opposite of the end of the bottle opener that removes a cap. The spring may be contiguous with an inner surface of the recess. In this example, when the bottle opener is in the initial position, the spring is compressed between the bottle opener and the inner surface. Also in this example, the case may include a button that is operable to release the locking mechanism and allow the spring to decompress to cause the bottle opener to move to the extended position.

In an embodiment, the bottle opener is friction fit in the case. In other words, the mechanism that is used to keep the bottle opener from sliding out to an extended position unintentionally is the friction between the bottle opener and the enclosure in which the bottle opener rests. In this way, manual push/pull operation of a thumb attached to the bottle opener or manual push/pull operation of the bottle opener causes moving the bottle opener to an extended position and/or to an initial position.

In a related embodiment, the bottle opener is constrained by a spring and ball bearing to hold the bottle opener in an initial position inside an enclosure. In this embodiment, the spring and ball bearing may also keep the bottle opener in an extended position when used to open a bottle.

Some embodiments described thus far are structured for the bottle opener sliding out from an enclosure to an extended position. In a related embodiment, the bottle opener swings out by rotating on point near the opposite side of the functional end of the bottle opener. This rotation motion is about the vertical axis that is perpendicular to one of the two main sides of the handheld device. The resulting or extended position of the bottle opener may be where the bottle opener is perpendicular to the length of the handheld device, in which case the bottle opening end is 90° from its initial position. Alternatively, the extended position of the bottle opener may be where the bottle opener is parallel to the length of the handheld device, in which case the bottle opening end is 180° from its initial position.

In a related embodiment, the functional end of the bottle opener "flips up," i.e., moves about the lateral axis (which runs parallel to the top and bottom sides of the handheld device).

V. Additional Features

In an embodiment, the case includes one or more electronic components that play recorded sounds that are activated by certain actions. Such actions may include sliding the bottle opener out to an extended position, opening a bottle using the bottle opener, and returning the bottle opener to its initial position.

In a related embodiment, the handheld device that is encompassed, at least partially, by the case executes a software application that detects a specific motion of the handheld device, where the specific motion is indicative of opening a bottle cap. The specific motion may be determined from detecting a starting position of the handheld device (e.g., in 3-dimensional space), an ending position of the handheld device, and, optionally, an amount of time that elapsed from the starting position to the ending position. The software application may read values from an accelerometer in the handheld device to accomplish detecting positions. For example, the yaw, pitch, and roll of the handheld device during a specific motion are measured to determine whether that specific motion indicates the opening of a bottle. In response to the software application detecting that the handheld device moved in that specific motion (or range of motion), the software application causes a particular sound to play. For example, the played sound may be the opening of a bottle, the cheer of a crowd, or a particular ringtone. Additionally or alternatively to causing a particular sound to play, the software application may cause the handheld device to display digital video, one or more digital images, or one or more icons.

Prior to the software application detecting the motion, the software application may allow a user to select the song or video to play and/or the image to display when the handheld device is moved in the specific motion described herein.

In an embodiment, a case is designed to allow a metal tool (e.g., a metal blade designed to function as a bottle opener) to be inserted into the case and allow the metal tool to make a physical or electronic connection between a phone (i.e., the handheld device in the case) and the metal tool. In this way, antenna performance may be improved due to the "extra" metal (i.e., of the metal tool) that may be used to receive a cell signal.

VI. Specific Embodiment

FIG. 8A, FIGS. 8B1-5, FIGS. 8C1-3, FIGS. 8D1-3, FIGS. 8E1-3, and FIGS. 8F1-2 illustrate a specific embodiment where the case is configured to provide protection to a handheld device and allow a tool to extend from the case and retract back into the case.

A. Main Components

Figure 8A:
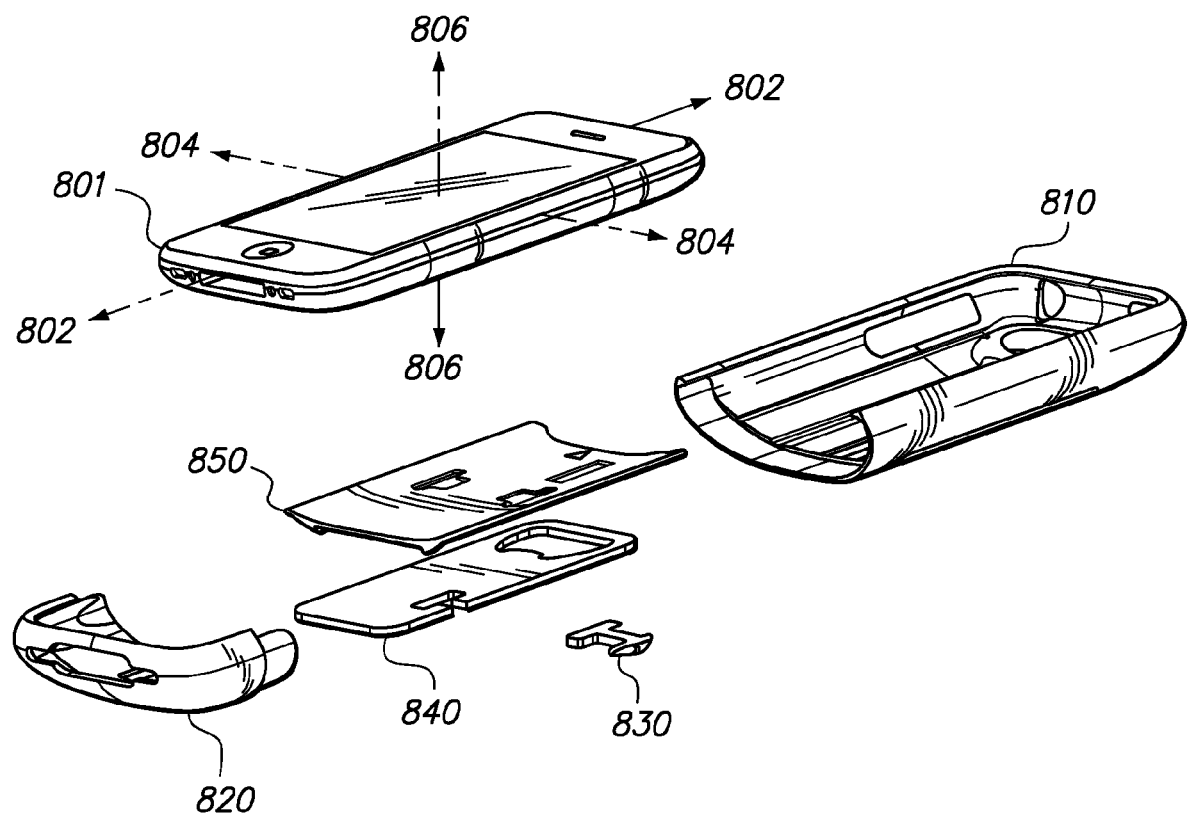

FIG. 8A depicts perspective views of a case. In an embodiment, a case comprises a top cover 810, a bottom cover 820, a knob 830, a blade 840, and an inner cover 850. The top cover 810 attaches to the bottom cover 820 to provide, to a handheld device, protection from forces resulting from dropping the case or striking the outside of the case. The knob 830 may be used to move the blade 840 to an extended position and back to an initial position. The inner cover 850 is used to provide, to the handheld device, protection from the blade 840 when the blade 840 is used to remove a bottle cap.

FIG. 8A also depicts a longitudinal axis, lateral axis, and vertical axis. The axes 802, 804, 806 are referenced herein to describe how different components of the case align with each other and the handheld device and how the different components move along an axis or rotate about an axis. The longitudinal axis 802 is parallel to a length of the case and the lateral axis 804 is parallel to a width of the case. For example, while the blade 840 moves along the longitudinal axis, certain components of the case prevent the blade from moving along any of the other axes and rotating about any of the axes.

B. Top Cover

FIG. 8B1-5 depict different views of the top cover 810. In an embodiment, top cover 810 includes an enclosure opening 812 from where the blade 840 extends and retracts. In an embodiment, the top cover 810 also includes a knob opening 814 that allows the thumb portion 850 of the knob 830 to be exposed to a user of the handheld device to enable the user to move the knob 830 along the longitudinal axis 802, which causes the blade 840 to also move along the longitudinal axis 802.

Other openings 816A, 816B, 816C, 816D in the top cover 810 accommodate other functions of the handheld device. For example, opening 816A allows a camera lens of handheld device to be exposed. Therefore, different cases may have different openings depending on the functions of the handheld devices.

The inside of the top cover 810 includes knob tracks 818 (depicted in FIGS. 8B1-3) where a portion (838) of the knob 830 rests. The knob tracks 818 ensure that the knob 830 can move along the longitudinal axis 802, but not along the lateral axis 804. Because the blade 840 fits around a portion 838 of the knob 830, the knob tracks 818 also ensure that the blade 840 does not move along the lateral axis 804.

The top cover 810 also includes grooves 819A-B (depicted in FIGS. 8B2-3) on two sides of the top cover 810. The groves 819A-B allow two edges of the inner cover 850 (described in more detail herein) to slide into the top cover 810 in order to prevent the inner cover 850 from moving along the lateral axis 804 and from moving along the vertical axis 806.

C. Bottom Cover

FIGS. 8C1-3 depict different views of the bottom cover 820. The bottom cover 820 fits securely with the top cover 810 to protect the handheld device from outside forces.

In an embodiment, the bottom cover 820 includes an opening 822 to accommodate one or more functions of the handheld device. The bottom cover 820 also includes grooves 824A-B that allow the blade 840 to be in the initial or original position without the corners of the non-opening end 844 blade 840 coming into contact with the bottom cover 820. The grooves 824A-B may also be designed to prevent the blade 840 from moving along the lateral axis 804.

D. Blade

FIGS. 8D1-3 depicts an embodiment of blade 840. As indicated above, the blade 840 may comprise any material that may be used to remove a bottle cap. In the embodiment of FIGS. 8D1-3, the blade 840 is 304 grade stainless steel. Other embodiments may use other materials and thicknesses.

Also, as indicated in FIG. 8D2, the dimensions of the blade 840 include the following: 14 gauge thickness (which is between 0.067 and 0.075 inches), 2.95 inches long (i.e., along the longitudinal axis 802), and 1.378 inches wide (i.e., along the lateral axis 804).

The blade 840 comprises an opening end 842 and a non-opening end 844. The opening end 842 comprises an opening that is configured to lift and to remove most bottle caps. The top edge of the opening and portions of the left and right edges of the opening are generally straight. The corners where the left edge meets the top edge and the right edge meets the top edge are rounded. The other portions of the left and right edges of the opening are generally straight and angled inward. The main portion of the bottom edge of the opening is generally straight and protrudes towards the center of the opening, causing the shape of the opening to be non-convex.

The blade 840 also comprises a knob fitting region 846 that is shaped to allow multiple sides of a portion (854) of the knob 830 to be surrounded by the blade 840. Thus, movement of the knob 830 along the longitudinal axis 802 also causes the blade 840 to move along the longitudinal axis 802.

E. Knob

FIG. 8E1-3 depict different views of the knob 830. The knob 830 comprises a thumb portion 832, a neck portion 834, and a blade portion 836. The thumb portion 832 is exposed to a user of the handheld device and is visible from a view of the outside of the case. The neck portion 834 connects the thumb portion 832 to the blade portion 836.

The blade portion 836 includes a ridge 838 that fits between the knob tracks 818 of the top cover 810. When the ridge 838 is between the knob tracks 818, the knob 830 is unable to move along the lateral axis.

The blade portion 836 also includes a notch 839 (or hole), which is on the opposite side of the blade portion that includes the ridge 838. An appropriately-sized detent in the inner cover 850 (described in more detail below) may rest in the notch 839. In this state, the knob 830 cannot move without a certain amount of effort. Thus, in this state, the blade 840, which is fitted to the knob 830, does not move unintentionally without a certain amount of force.

In an alternative embodiment, the blade 840 includes a notch into which an appropriately-sized detent in the inner cover 850 may rest.

F. Inner Cover

FIG. 8F1-2 depict different views of an embodiment of the inner cover 850. The inner cover 850 is configured to protect the handheld device from the blade 840 when the blade 840 is used to remove a bottle cap. When the blade 840 is used to remove a bottle cap, a significant amount of force may be exerted by the non-opening end 842 against the handheld device. With great enough magnitude, this force has the potential to damage sensitive parts of the handheld device or to compress, dent or puncture the device. Without a layer between the blade 840 and the handheld device, then the handheld device would be subject to the direct and full force of the non-opening end 844 that is generated when opening a bottle cap. In an embodiment, inner cover 850 is between the handheld device and the blade 840.

Also, placement of the inner cover 850 on the blade 840 (on the side of the blade 840 opposite of the top cover 810) prevents the blade 840 from moving along the vertical axis 806.

The inner cover 850 may be any shape. However, in this embodiment, the sides of the inner cover 850 are slightly curved away from the blade 840. In this way, when the blade 840 is used to remove a bottle cap, some of the force exerted by the non-opening end 844 on the blade side of the inner cover 850 is distributed to the sides of the inner cover 850. Two edges of the inner cover 850 are designed to come into contact with two rounded sides of the top cover 810 along where the grooves 819A, 819B are located. In this configuration, some of the force is distributed to sides of the top cover 810.

The inner cover 850 includes springs 852A-B that are able to move along the vertical axis 806. The blade 840 may be in constant contact with the ribs 854A-B, which are part of the springs 852A-B. The springs 852A-B are an integral part of the inner cover 850 and are each connected to the inner cover 850 at one edge. In an embodiment, the springs 852A-B help keep the blade 840 from moving along the vertical axis 806. Also, the springs 852A-B allow the thickness of the blade 840 to vary slightly so that, regardless of the thickness of the blade 840 (within a certain range), the blade 840 is urged into constant contact with the springs 852A-B. This contact allows friction to be an element that prevents the blade 840 from moving too easily from the initial position to an extended position or the converse.

The inner cover 850 also includes a front detent 856 and a rear detent 858. As indicated above, the blade portion 836 of the knob 830 includes the notch 839. The front detent 856 is at a location on the inner cover 850 such that, when the blade 840 (and thus the knob 830) is in the extended position, the front detent 856 is aligned and fits tightly with the notch 839. When the front detent 856 is aligned with the notch 839, the blade 840 does not easily slide back into the enclosure. Thus, the front detent 856 may prevent the blade 840 from unintentionally moving back into the enclosure during use.

The front detent 856 is part of a portion 860 of material that is connected to the inner cover 850 at two edges 862A-B. The gaps 864A-B between the portion 860 and the inner cover 850 allow the front detent 856 to flex about the two edges 862A-B. Without the gaps 864A-B, the front detent 856 would not adjust easily and it would be difficult for a user to the move the blade 840 (when the front detent 856 and notch 839 are aligned) back into the initial or enclosed position.

The rear detent 858 functions similar to the front detent 856. The rear detent 858 is at a location on the inner cover 850 such that, when the blade 840 (and, thus, the knob 830) is in the initial or enclosed position, the rear detent 858 is aligned with the notch 839. When the rear detent 858 is aligned with the notch 839, the blade 840 does not easily slide out of the enclosure. Thus, a purpose of the rear detent 858 is to prevent the blade 840 from unintentionally moving out of the enclosure.

VII. Additional Cases Adapted to Secure a Bottle Opener

Figure 9A:
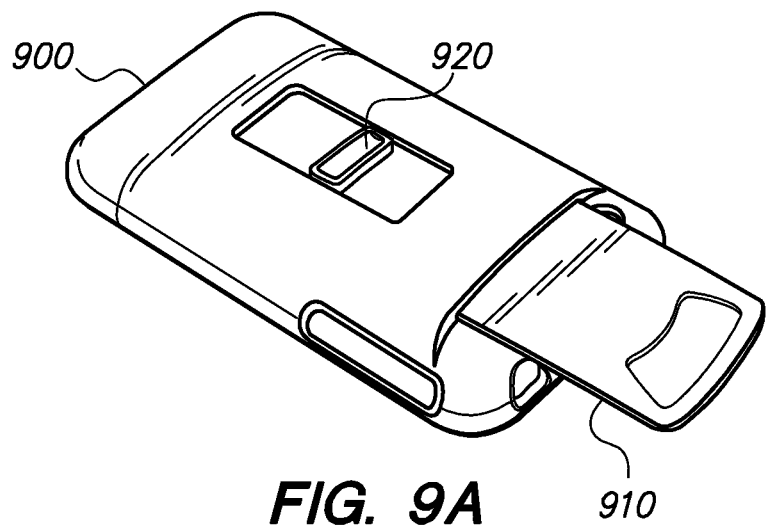
FIG. 9A-B, FIG. 10A-B, FIG. 11A-B are views of different examples of cases.
Figure 9B:
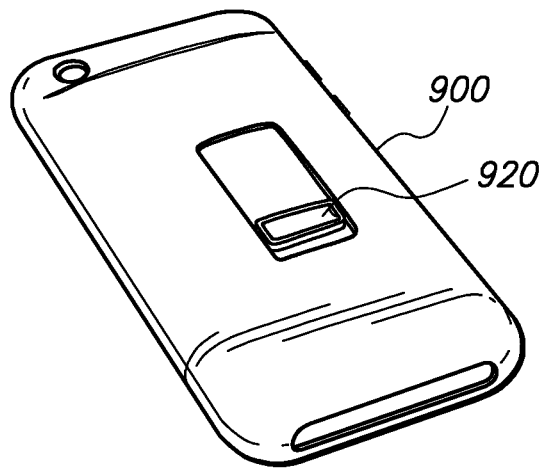

FIG. 9A, FIG. 9B, FIG. 10A, FIG. 10B, FIG. 11A, and FIG. 11B are views of different examples of cases that are adapted to secure a bottle opener. FIGS. 9A and 9B depict a case 900 with a built-in enclosure from which a blade 910 extends (as in FIG. 9A) and retracts (as in FIG. 9B). Case 900 also includes a knob 920 on the back side of the case 900, instead of on a side of the case 900.

Figure 10A:
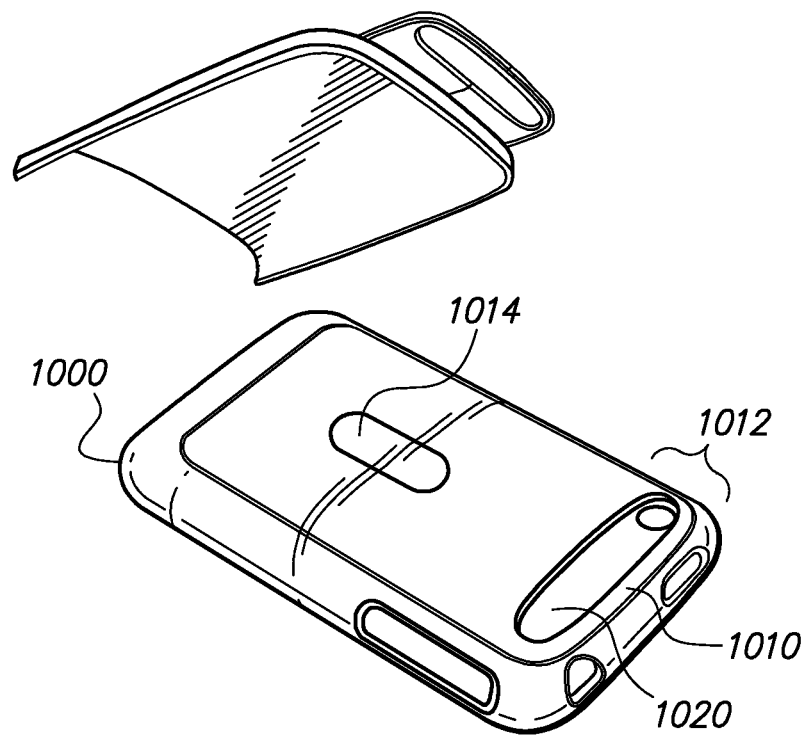
Figure 10B:
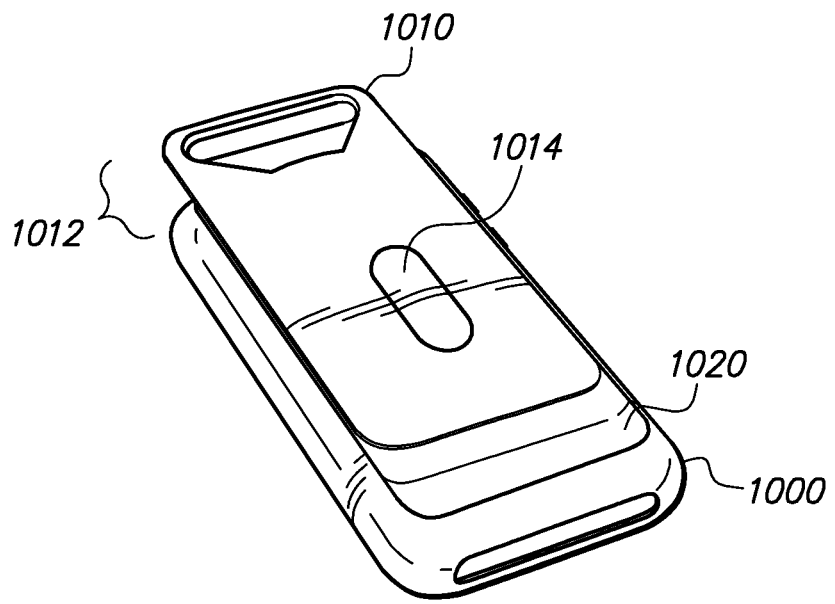

FIGS. 10A and 10B depict a case 1000 with a blade 1010 that fits into a recess 1020 of one side of the case 1000. The dimensions of the recess 1020 are such that the recess 1020 allows the blade 1010 with similar dimensions to fit tightly in the recess 1020. Once the blade 1010 is attached or secured to the case 1000 (as in FIG. 10A), the blade 1010 does not detach from the case 1000 without an amount of force pulling on the opening end 1012 of the blade 1010 or an amount of force pushing on a recess 1014 in the blade 1010. Thus, the blade 1010 is designed to be used as a bottle opener when it is removed or detached from the case 1000.

Figure 11A:
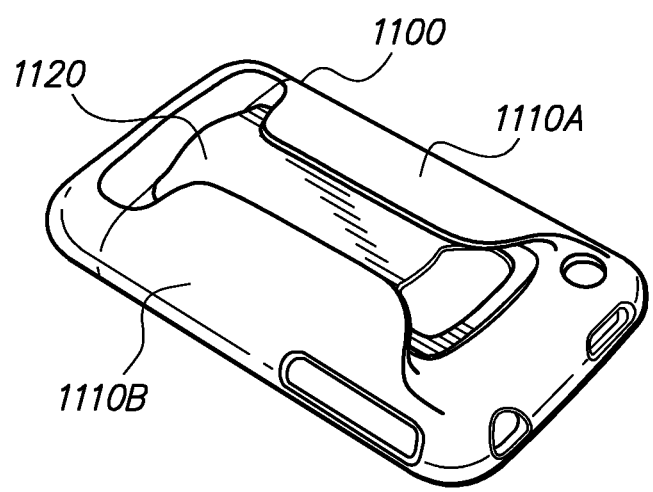
Figure 11B:
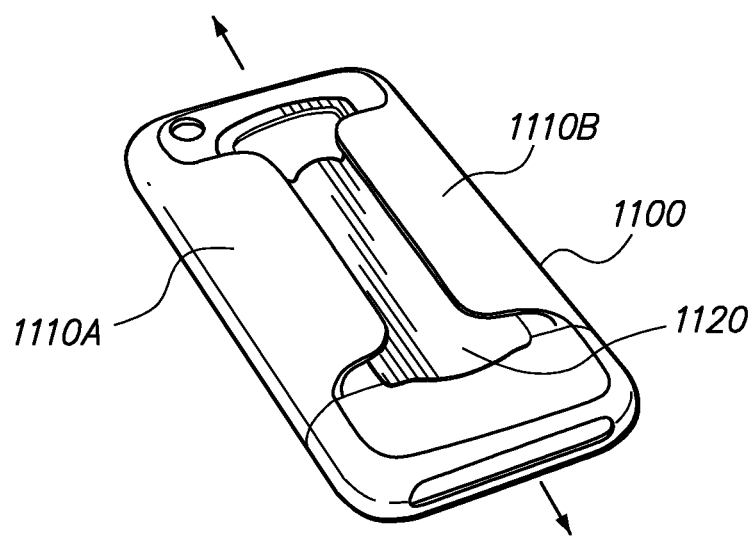

FIGS. 11A and 11B depict a case 1100 with an enclosure that is formed by two folds 1110A-B of the case 1100 extending from two opposing sides of the case 1100. The enclosure is sized and adapted to securely fit a blade 1120. Thus, like blade 1010, the blade 1120 is designed to be used as a bottle opener when it is removed or detached from the case 1100. Alternatively, other items may fit securely in the enclosure that is formed by the two folds 1110A-B.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An apparatus comprising:
    a rigid shell to contain a mobile phone that has a front side and a back side;
    a rigid tool that is slidably mounted within the rigid shell;
    means for sliding the rigid tool out of the rigid shell from an initial position to an extended position;
    wherein the front side of the mobile phone is exposed when the rigid tool is in the initial position and the extended position;
    wherein the rigid tool has a first end portion configured as a bottle opener when the rigid tool has been slid out of the rigid shell;
    electronic components disposed within the rigid shell and configured to play recorded sound responsive (a) to moving the rigid layer between the initial position and the extended position or (b) to opening a bottle with the first end portion.

2. The apparatus of claim 1, wherein the means for sliding comprises a tab formed in the rigid tool and that protrudes through an opening in the rigid shell and is operable to move the rigid tool between the initial position and the extended position.

3. The apparatus of claim 1, wherein the rigid tool is secured within a recess of the rigid shell by a spring and ball bearing.

4. The apparatus of claim 1, wherein the rigid tool is secured in the initial position and the extended position by a locking mechanism disposed within the rigid shell.

5. An apparatus comprising:
    a rigid shell to contain a mobile phone that has a front side and a back side;
    a rigid tool that is slidably mounted within the rigid shell;
    means for sliding the rigid tool out of the rigid shell from an initial position to an extended position;
    wherein the rigid tool has a first end portion configured as a bottle opener when the rigid tool has been slid out of the rigid shell;
    wherein the rigid tool is secured by a spring that is in a recess of the rigid shell, is contiguous with a second end portion of the rigid tool and an inner surface of the recess, and is compressed between the rigid tool and the inner surface when the rigid tool is in the initial position, the apparatus further comprising a button operable to allow the spring to decompress to cause the rigid tool to move to the extended position.

6. The apparatus of claim 1, wherein the rigid shell and the rigid tool are a single unit.

7. The apparatus of claim 1, wherein the rigid shell is made of at least one of plastic, metal, carbon fiber, composite material, or a combination thereof.

8. The apparatus of claim 1, wherein the rigid tool is an integral molded-in component of the rigid shell.

9. An apparatus comprising:
    a rigid shell that is adapted to contain a mobile phone;
    a rigid tool that is attached to the rigid shell and that has a first end portion that is adapted to function as a bottle opener;
    a knob, wherein the rigid tool comprises a region that is adapted to fit around a portion of the knob such that movement of the knob causes the rigid tool to move in unison with the knob.

10. The apparatus of claim 9, wherein:
    the rigid tool is moveable between a first position and a second position;
    the first end portion is operable as a bottle opener when the rigid tool is in the first position; and
    the first end portion is encased by the rigid shell when the rigid tool is in the second position.

11. The apparatus of claim 9, wherein:
    the rigid tool comprises metal;
    the rigid shell is adapted to allow the metal of the rigid tool to be connected to an antenna of the mobile phone.

12. The apparatus of claim 9, wherein:
    the rigid shell comprises an outer cover and an inner cover that is adapted to be disposed between the mobile phone and the rigid tool;
    the rigid tool is adapted to be disposed between the inner cover and the outer cover.

13. The apparatus of claim 12, wherein:
    the outer cover comprises a top cover and a bottom cover;
    the top cover is adapted to connect with the bottom cover;
    the top cover includes groves on opposing sides of the top cover;
    the groves are adapted to allow two opposing edges of the inner cover to slide into the top cover along the groves.

14. The apparatus of claim 13, wherein:
    an inside of the top cover includes tracks;
    a second portion of the knob is adapted to fit within the tracks and slide along the tracks.

15. The apparatus of claim 13, wherein the knob is adapted to be connected to the rigid tool, wherein:
a second portion of the knob includes a notch;
the inner cover includes a detent that is adapted to fit within the notch;
when the detent is fit within the notch, the knob is more difficult to slide relative to when the detent is not within the notch.

16. The apparatus of claim 12, wherein:
the inner cover includes one or more springs that are adapted to force the rigid tool away from the mobile phone and toward the outer cover.

17. A case for a mobile phone, the case comprising:
a rigid shell that comprises a top cover and a bottom cover;
a rigid tool that includes a bottle opening end that is operable as a bottle opener;
an inner cover that is adapted to (a) be disposed between the mobile phone and the rigid tool and (b) provide, to mobile phone, protection from the rigid tool when the bottle opening end is used to remove a cap from a bottle.

18. The case of claim 17, wherein:
the bottle opening end is operable as the bottle opener when the rigid tool is in a first position;
the bottle opening end is encased by the top cover and the bottom cover when the rigid tool is in a second position that is different than the first position.

19. The case of claim 17, further comprising:
a knob that is connected to the rigid tool such that the rigid tool moves when the knob is moved;
wherein the inner cover includes one or more tracks;
wherein a portion of the knob includes a ridge that is adapted to fit between the one or more tracks.

20. The case of claim 17, further comprising:
a knob that is connected to the rigid tool such that the rigid tool moves when the knob is moved;
wherein a portion of the knob includes a notch;
wherein the inner cover includes a detent that is adapted to fit within the notch;
wherein when the detent is within the notch, the knob is more difficult to slide relative to when the detent is not within the notch.

21. The case of claim 20, wherein:
the detent is a first detent that is located at a first position on the inner cover such that when the first detent is within the notch, the rigid tool is in a first tool position where the bottle opening end is operable as a bottle opener;
the inner cover includes a second detent that is different than the first detent and that is adapted to fit with the notch;
the second detent is located at a second position on the inner cover such that when the second detent is within the notch, the rigid tool is in a second tool position where the bottle opening end is not operable as a bottle opener.

22. An apparatus comprising:
a case for a mobile phone;
one or more additional materials within the case that are molded into the case to form a second layer on one side of the case;
a sliding rigid tool in the case;
in the case, means for causing compressive force exerted from using the sliding rigid tool to be directed into the case and away from the mobile phone.

* * * * *